(No Model.)
C. S. JONES, W. W. CROOKER & F. ARTÓS.
APPLYING ELECTRICITY FOR DESTROYING LIVING ORGANISMS IN THE BODIES OF SLAUGHTERED ANIMALS.
No. 337,334. Patented Mar. 2, 1886.
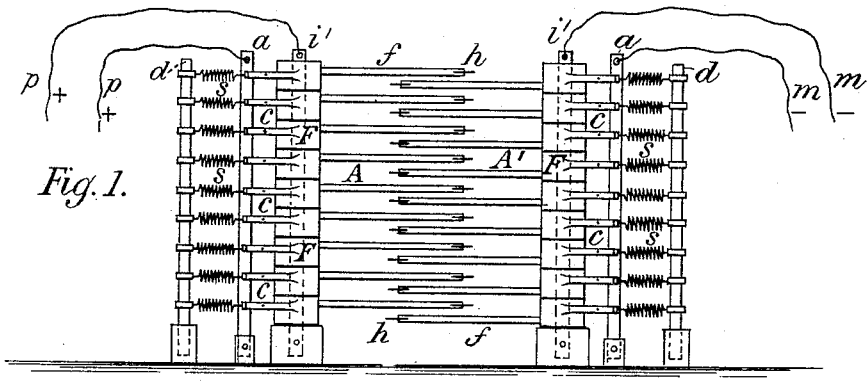
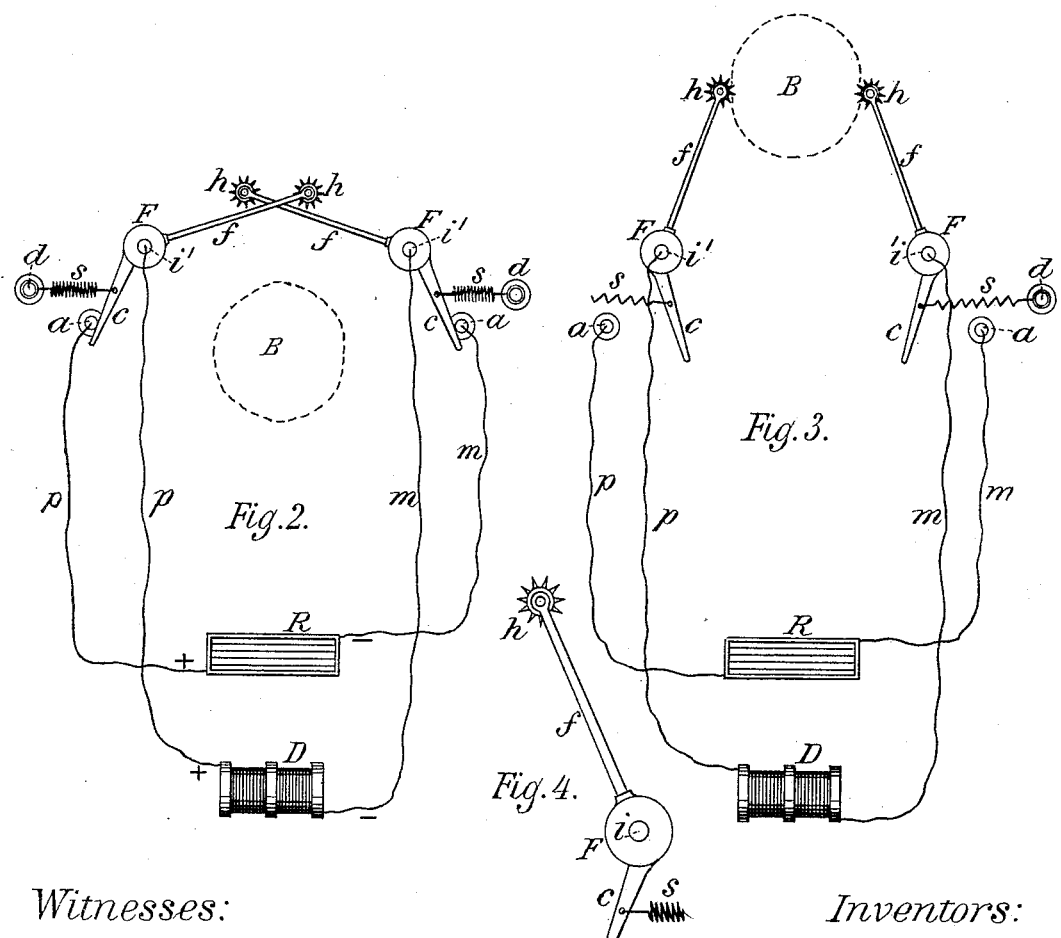
Witnesses:
Inventors:
Charles Storrs Jones
William Warren Crooker
Frederick Artós

UNITED STATES PATENT OFFICE.

CHARLES STORRS JONES, OF CHICAGO, WILLIAM WARREN CROOKER, OF WAUKEGAN, AND FREDERICK ARTÓS, OF CHICAGO, ILLINOIS.

APPLYING ELECTRICITY FOR DESTROYING LIVING ORGANISMS IN THE BODIES OF SLAUGHTERED ANIMALS.

SPECIFICATION forming part of Letters Patent No. 337,334, dated March 2, 1886.

Application filed January 2, 1885. Serial No. 151,859. (No model.)

*To all whom it may concern:*

Be it known that we, CHARLES STORRS JONES, FREDERICK ARTÓS, and WILLIAM WARREN CROOKER, citizens of the United States of America, the first two named residing in Chicago, in the county of Cook, and the latter-named residing in Waukegan, county of Lake, all of the State of Illinois, have invented a new and useful Improvement in Applying Electricity for Destroying Living Organisms in the Bodies of Slaughtered Animals used for Food, of which the following is a specification.

Our invention relates to a device consisting in the arrangement and construction of a suitable mechanism in connection with an electric apparatus which, when brought in contact with the passing body of a slaughtered animal, discharges electricity into and through the same, the concussive force of which results in the instant destruction of living organism supposed to be present therein, without injuriously affecting the consumable parts of the animal so treated, but rendering the same more susceptible to receive the brine preparatory to the process of preservation.

Referring to the accompanying drawings, Figure 1 represents a front elevation of the mechanical device adapted to be connected with an electrical apparatus. Fig. 2 is a top view of the foregoing, showing the mechanism in its normal position, with the electric apparatus arranged in proper connection therewith. Fig. 3 exhibits a similar view as the same with the mechanism in its position when operated by the passing body of the slaughtered animal, the position of the latter being indicated by dotted lines; and Fig. 4 shows in detail a portion of the mechanism constituting one of the terminals of the electrical apparatus.

Upon investigating it has been ascertained that living organism, and more especially parasites, infest only the muscular and nervous system of a body; and as living animals are natural conductors of electricity, consequently the applied force in contact with the body of a slaughtered animal intended for food destroys in its course the life of parasites, if present therein. To accomplish this result, we introduce a metallic gate, as shown in Fig. 1 of the drawings, consisting of two oppositely-arranged wings, A A', composed of a series of arms, $ff$, slipped on vertical fixed iron corner-posts $i'\ i'$, which are turning on the same in radial directions independently when forced open by a passing body, and closing automatically, the respective arms folding simultaneously in an interposed position, each toward the other. The arms $ff$ are fastened to annular disks F F, each having an aperture, $i$, in its center, as shown in detail, Fig. 4, to be mounted on the iron corner-posts $i'\ i'$, and a projecting lever, $c$, which extends a short distance from the circumference of the said disk in an angular direction to the arm. The extreme ends of the arms $ff$ are provided with a sharp-pointed revolving star-wheel or spur, $h$, and the lever carries a spiral spring, $s$, which is secured to an upright post, $d$, while the stop-post $a$ is in a similar position fixed in front of the springs $s\ s$, between the upright posts $d\ d$ and the iron corner-posts $i'\ i'$, for the purpose of keeping the arms of the gate in position by the resilient force of the springs, which cause the said levers to rest with their end portions on the stop-post $a$. The said gate or mechanical device is in connection with a powerful dynamo-electric machine, D, which is combined with a resistance apparatus, R, and the connections are made in the usual way by means of a wire system, which renders the gate a conductor of the generated electric force to be applied to a passing body. The positive (+) and negative (−) poles from the dynamo-electric machine and the resistance apparatus are connected, respectively, with the iron posts $i'\ i'$ and $a\ a$ of the gate to establish a complete circuit through the dynamo and the resistance apparatus when the mechanism is in its normal position.

In order to carry our invention into effect by discharging an electric current into and through the body of an animal after the usual performance of the slaughtering and dressing processes, especially with reference to hogs, said body is caused to enter the gateway, and at the moment it comes in contact with the arms $ff$ the same open outwardly more or less, according to the shape of the passing body, disconnecting at the same time the levers $c\ c$ from their resting-place on the stop-posts $aa$, which action diverts the electric current derived from the dynamo-electric machine D from the resistance apparatus and passes it through the said body when in the position as indicated in dotted lines B in Fig. 3 of the drawings, and as the sharp-pointed spurs $h\ h$ on the ends of the arms $ff$ puncture the epidermis of the body on opposite sides as the same passes through the gate it will present a visible indication of the effective operation of the device and insure positive contact with the true skin and the muscular and nervous system of the animal, producing the desired result, as previously stated.

As the animal passes through the gate the simultaneously-relieved arms $ff$ return to their normal position by the action of the spiral springs $s\ s$, attached to the levers $c\ c$, and the electrical current from the dynamo-machine D is restored to its original path through the resistance apparatus R, and the normal condition of the electrical current in relation to the whole apparatus is re-established.

Having thus described our invention, we do not limit ourselves to the specific construction of the apparatus herein described for effecting the objects specified, as various modifications may be made in the construction and arrangement of the movable arms and means for shunting the circuit from the spur-terminals of said arms to the resistance-coil without departing from our invention; and we hereby reserve the right to claim in a separate application the process independently of the mechanism herein described.

We claim and desire to secure by Letters Patent—

1. An apparatus for the application of electric currents to the bodies of slaughtered animals, consisting of the combination, with the opposite poles of an electric generator, of movable arms or similar contrivances provided with puncturing devices and supported mechanically to bear upon the body of an animal passed beneath or between them.

2. In an apparatus for the application of electric currents to the bodies of slaughtered animals, the combination of movable arms or similar contrivances provided with puncturing devices and connected with the opposite poles of an electric generator, and a resistance-coil normally connected in circuit with said generator through said arms and disconnected therefrom by the movement of the arms when in contact with the body, substantially as described, and for the purpose specified.

3. The swinging arms provided with puncturing devices and arranged to form a double gate, substantially as described, in combination with the opposite poles of an electric generator, substantially as and for the purpose specified.

4. The combination of the swinging arms $f\ f$ with the terminal conductors of an electric generator, D, and the posts $a\ a$, connected with the terminal conductors of a resistance apparatus, R, and adapted to form electrical connection with said swinging arms when in their normal position, substantially as and for the purpose described.

In testimony that we claim the foregoing as our own we have hereunto affixed our signatures in the presence of two subscribing witnesses.

CHARLES STORRS JONES.
WILLIAM WARREN CROOKER.
FREDERICK ARTOS.

Witnesses:
W. B. CANDEE,
F. C. PORTER.